(12) United States Patent
Assous et al.

(10) Patent No.: US 12,504,267 B2
(45) Date of Patent: Dec. 23, 2025

(54) METHOD OF AND APPARATUS FOR DETERMINING VARIATIONS IN WALL THICKNESS IN FERROMAGNETIC TUBES

(71) Applicant: REEVES WIRELINE TECHNOLOGIES LIMITED, Loughborough (GB)

(72) Inventors: Said Assous, Radcliffe-on-Trent (GB); Peter Adrian Spencer Elkington, Loughborough (GB); Mark Bacciarelli, Loughborough (GB)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 460 days.

(21) Appl. No.: 18/000,554

(22) PCT Filed: Jul. 2, 2021

(86) PCT No.: PCT/GB2021/051684
§ 371 (c)(1),
(2) Date: Dec. 2, 2022

(87) PCT Pub. No.: WO2022/003366
PCT Pub. Date: Jan. 6, 2022

(65) Prior Publication Data
US 2023/0213323 A1      Jul. 6, 2023

(30) Foreign Application Priority Data
Jul. 3, 2020   (GB) .................................... 2010248

(51) Int. Cl.
*G01B 7/06*      (2006.01)
*E21B 47/08*     (2012.01)
*G01V 3/26*      (2006.01)

(52) U.S. Cl.
CPC ................ *G01B 7/10* (2013.01); *E21B 47/08* (2013.01); *G01V 3/26* (2013.01)

(58) Field of Classification Search
None
See application file for complete search history.

(56) References Cited

U.S. PATENT DOCUMENTS

| 8,978,773 B2 | 3/2015 | Tilley | |
| 2002/0043973 A1* | 4/2002 | Amini | G01B 7/10 324/229 |

(Continued)

FOREIGN PATENT DOCUMENTS

| CA | 2861453 A1 * | 3/2014 | .......... G01N 17/006 |
| EP | 3346265 A1 | 11/2018 | |
| GB | 2372057 A | 8/2002 | |

OTHER PUBLICATIONS

GB Search Report issued Mar. 24, 2021 for GB Patent Application No. GB2010248.9, 1 pages.

(Continued)

*Primary Examiner* — Huy Q Phan
*Assistant Examiner* — Carl F.R. Tchatchouang
(74) *Attorney, Agent, or Firm* — Smith IP Services, P.C.

(57) ABSTRACT

A method can include energizing a tube with a longitudinally extending magnetic field generated inside the tube, using a magnetic field-detecting logging tool to generate magnetic flux signals generated inside the tube externally of the material of the tube wall resulting from such energizing at circumferential locations on the inner surface of the tube and at distances along the tube, iteratively using a model of the relationship between the generated magnetic flux signals and the thickness of the tube wall to derive a thickness profile of the tube wall by using (i) the magnetic permeability of the tube material deduced from the magnetic flux signals and (ii) a defect-free flux parameter representative of any non- (Continued)

linearity between the magnetic field strength and flux density in the tube, the iteration including using the model to calculate an initial approximate wall thickness profile using an initial estimate of the defect-free flux parameter.

29 Claims, 9 Drawing Sheets

(56) References Cited

U.S. PATENT DOCUMENTS

| | | |
|---|---|---|
| 2002/0117300 A1 | 8/2002 | Spencer et al. |
| 2006/0202700 A1* | 9/2006 | Barolak ............... E21B 47/006 324/345 |
| 2009/0058415 A1* | 3/2009 | Dorovsky ............... G01V 3/26 324/303 |
| 2009/0243604 A1 | 10/2009 | Dutta et al. |
| 2013/0068475 A1 | 3/2013 | Hofman et al. |
| 2013/0314092 A1* | 11/2013 | Shumway ............... G01V 3/40 324/346 |
| 2017/0298707 A1 | 10/2017 | Sargent et al. |
| 2021/0356620 A1* | 11/2021 | Han ....................... E21B 47/07 |

OTHER PUBLICATIONS

PCT Search Report issued Sep. 15, 2021 for PCT Patent Application No. PCT/GB2021/051268, 5 pages.

PCT Written Opinion issued Sep. 15, 2021 for PCT Patent Application No. PCT/GB2021/051268, 8 pages.

International Search Report for International Application No. PCT/GB2021/051684, dated Sep. 30, 2021.

* cited by examiner

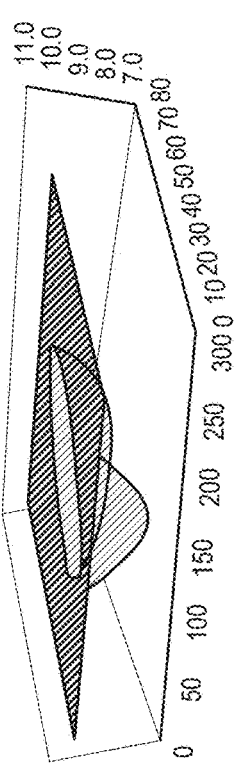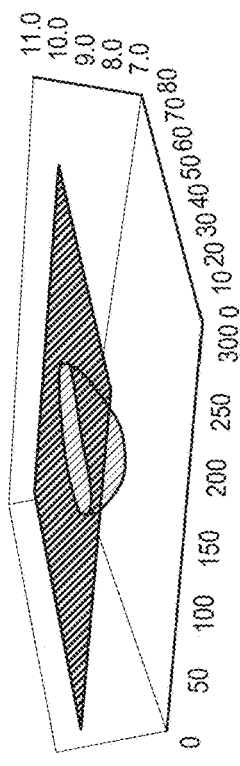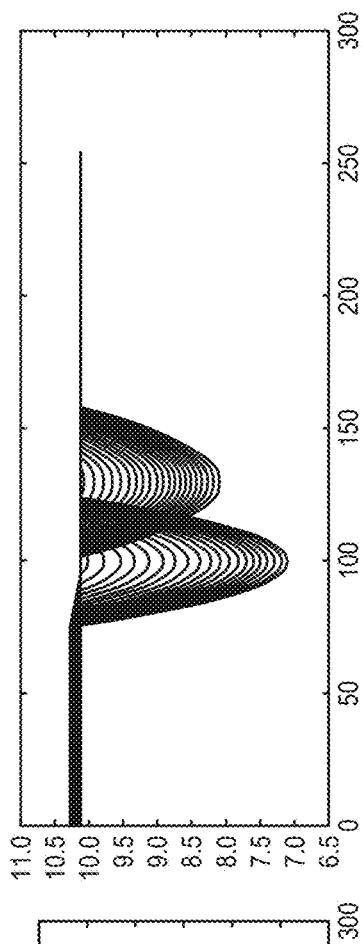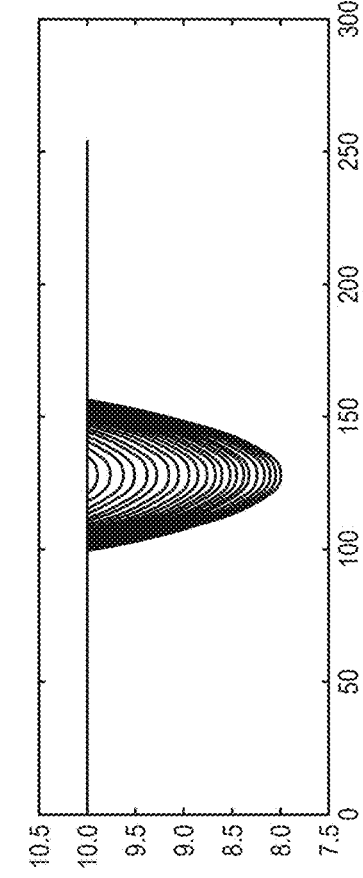
Figure 8b
Figure 8a

METHOD OF AND APPARATUS FOR DETERMINING VARIATIONS IN WALL THICKNESS IN FERROMAGNETIC TUBES

CROSS-REFERENCE TO RELATED APPLICATIONS

This application is a national stage under 35 USC 371 of International Application No. PCT/GB2021/051684, filed on 2 Jul. 2021, which claims priority to United Kingdom Application No. GB2010248.9, filed on 3 Jul. 2020. The entire disclosures of these prior applications are incorporated herein by this reference.

The disclosure hereof pertains to a method of and apparatus for determining variations in wall thickness in ferromagnetic tubes. In particular the disclosure relates to such tubes when formed as fixed, subterranean, serially joined lengths of wellbore casing or liner.

Casing

Casing as is well known is elongate, metal (typically ferromagnetic, e.g. steel) tubing that in the oil and gas industries is inserted into drilled boreholes (the terms "borehole" and "wellbore" being used essentially synonymously herein) for the purposes of lining and stabilising the boreholes; protecting the formations in which they are drilled; and (as needed) facilitating the passage of equipment along the boreholes. Liner is physically similar to casing and for purposes of this disclosure is equivalent. References herein to casing therefore may be understood as applying to liner.

Casing usually is inserted as a series of tube lengths from a drilling rig into a newly formed borehole (or part of a borehole, especially when casing is inserted before completion of the required drilling operations as is sometimes the case). The discrete lengths of casing are joined one to another by casing collars, the nature and engineering of which are well known in oil and gas production arts.

Once the casing is in position extending along a chosen length of the borehole cement is pumped into the annulus between the exterior of the casing and the formation. This fixes the casing in place, extending perhaps for many hundreds of feet between a relatively uphole part of the borehole and a relatively downhole part (the terms "uphole" and "downhole" being familiar to the person of skill in the art and not requiring further explanation herein).

Hangers may be employed to locate and help fix the casing, and as a result often it is not necessary to cement the casing over the whole length of a borehole.

Casing frequently is not of one and the same diameter over the whole of a cased length of borehole. On the contrary it is commonplace for production casing at a downhole end of a borehole to be of lesser diameter than casing located at a further uphole position. Moreover it is known for some types of casing to be installed inside other casing lengths in order to create, in places, cased borehole sections that have multiple casing walls lining the rock of the formation.

Tubing known as production tubing or production casing typically is installed at the downhole end of a casing string. Production tubing differs from other casing in that usually it is not encircled by cement and therefore when perforated as explained below provides a fluid communication path from the reservoir to the interior of the borehole. However in several other respects production tubing is similar to casing. References herein to tubes therefore include production tubing within their scope.

Usually the casing or production tubing is perforated in a chosen manner where the borehole passes through a reservoir containing hydrocarbons, so that the latter can flow or be pumped from deep underground through the casing wall to surface locations where they can be refined and processed in various well-known ways.

The invention disclosed herein is of use as a minimum in numerous casing, liner and production tubing situations such as those described.

Corrosion Damage

The various characteristics of casing make it generally impossible to replace sections of casing should they become damaged after installation. The significant lengths and small internal diameters of the boreholes, and the harsh environments they represent, moreover mean it is very difficult reliably to inspect the casing using conventional (e.g. optical) means.

Damage to casing however frequently occurs. One commonly encountered form of damage is the loss of metal forming the casing wall through corrosion.

In this regard the environment inside the casing may be chemically aggressive in various ways, and this can cause oxidation and weakening of the metal of the casing. As the casing metal weakens it becomes removed through the action of fluids such as hydrocarbons, water and chemical mixtures (which fluids despite the use of downhole well screens may contain abrasive debris) pumped inside the casing. As a result corroded regions or pits arise in which the casing wall through loss of the metal of the casing is weaker and thinner than intended.

Such regions may fail. This often has seriously deleterious results, perhaps causing either the borehole to cease production or (sometimes) the whole of a reservoir to become damaged and non-productive. Casing failures resulting from corrosion moreover can lead to downhole blow-outs and similar potentially catastrophic events.

All corrosion-caused casing failures in short are strongly undesirable and typically incur extremely high costs. There is a need to improve the ability to inspect and monitor downhole casing in a manner reliably identifying metal loss before failures occur. This would then permit timely casing repair, e.g. through the addition of internal patch liners.

Contrast with Pipelines

In oil and gas pipelines it is known to use devices referred to as intelligent pigs for the purpose of carrying out interior tube wall inspections. Pipelines are of relatively large internal diameter (with pipeline diameters of up to 1.2 m in use around the world) with the result that the pigs are of commensurately large size. This allows the pigs to support apparatuses that can image the interior tube walls of the pipelines.

It is not however viable to use pigs of this kind in cased boreholes, in part because the interior diameter of e.g. production casing is usually significantly less than that of pipeline. As a result existing pig designs simply do not fit inside cased boreholes, while their engineering means that they cannot be made smaller. Moreover the environments inside pipelines are generally constant and benign to the integrity of the pigs, which therefore can readily be designed to withstand the in-pipeline conditions. This is not the situation in casing, where the environment is likely to change over time, may be hard to predict and may be considerably more chemically and abrasively aggressive than that prevailing in pipelines.

In addition it is generally relatively straightforward to cause movement of a pig along a pipeline using the pressure of fluid within the pipeline to drive the pig in the direction of flow of the fluid. Such conveyance is not possible in casing, in which wireline techniques (explained below) are the norm. In general pigs are not designed for wireline conveyance and could not readily be re-designed to accommodate this conveyance method.

Moreover in pipelines as a result of their location typically only slightly below ground level access is possible at multiple locations along the pipeline length. In contrast it usually is possible to access the inside of installed casing only from a single, surface location. This means that any inspection equipment must travel for a long distance along the borehole before it reaches a region it is required to survey. The pigs are not designed for use in this way, and even if this was not the case their recovery from deep underground inside casing would be problematic, further rendering them completely unsuitable for casing inspection work.

Magnetic Flux Leakage Techniques

Partly in view of the aforementioned difficulties routine inspection of installed casing is carried out using logging tools that operate on the basis of detecting magnetic flux leakage (MFL). Such leakage is associated with reductions in casing wall thicknesses.

As is well known a logging tool typically is a robust, elongate, rigid cylinder the exterior diameter of which may be made small enough to fit inside a borehole even when this has been cased as described. Logging tools are in use conveyed along boreholes from surface locations in order to carry out logging operations.

To this end most logging tools support a source of energy that is caused or permitted to emit externally of the logging tool once it is in position in a downhole location; and one or more detectors or sensors of such energy that has been altered by conditions encountered outside the logging tool, either in the rock of the formation or (as is of present interest) in the material of the casing.

The sensors are spaced from the energy source(s) along the lengthwise direction of the elongate logging tool, and generate signals (that typically are electrical signals) indicative of the returned energy they detect. Such signals may be transmitted in various ways and (following processing) made available at a surface location for analysis and interpretation. Depending on the exact logging tool design the signals are processed either within the logging tools, at the downhole location; or at a surface location. It is also known to perform some processing activity downhole and some at a surface location.

The signals may be formed into logs, that are ordered collections, arrays or matrices of data represented by the signals or parts, integrals or derivatives thereof. The logs and the signals forming them may be transmitted, stored and processed in a variety of ways and may be subject to mathematical operations; but the essence of a log is a collection of physical (e.g. electrical or electronic) signals. When log data are described as being subjected to mathematical operations therefore this may be taken as a reference to modification of physical signals in accordance with mathematical rules and operators.

One output of a logging tool that is often particularly desired is an image log, in which the signals after processing are rendered in a visually meaningful form e.g. as plot lines or regions of colour and/or shading in a graphical display or print-out. Such a display may be interpretable by humans and/or may be of a form that is machine-interpretable.

Known MFL logging tools are conveyed into cased boreholes supported on wireline, the nature of which is well known to the person of skill in the art. Wireline is strong, elongate cabling that is able to support the mass of the logging tool by suspension and permit the transmission of electrical signals between the logging tool and a surface location (and vice versa). The wireline therefore can accommodate the transmission of log signals from the logging tool to surface processing and imaging equipment; and may also permit the transmission of electrical commands from the surface location to the logging tool.

The known designs of MFL logging tool include powerful magnets arrayed in a circumferential manner such as to emit a magnetic field outwardly of the tool. When appropriately commanded using the wireline command signals described above the sensors of the MFL logging tool detect magnetic energy returning to the logging tool that has been emitted as described and influenced by the metal of the casing. The processing apparatus then seeks to interpret the signals output by the sensors in a manner indicative of the presence (or otherwise) and depth of corrosion damage.

Hitherto the signals output by the sensors of a logging tool as described have been processed in order to identify wall thickness variations of interest using peak amplitude methods, peak amplitude derivative methods or using pattern matching algorithm, machine learning or artificial intelligence (neural net) approaches.

All the known methods of processing MFL logging tool outputs are associated with serious defects.

Peak Amplitude Methods

The physics of MFL measurements dictate that peak amplitude cannot provide a unique penetration (corrosion metal loss) solution because this also depends on other factors whose properties are unknown or must be assumed. This is also true when using amplitude derivatives. In particular the following factors render peak amplitude methods inaccurate:

1, The magnetic properties of the casing. These depend on the grade of the casing and its prevailing state of stress. The grade may be known from records (noting that casing records are not always accurate); but the stress state is rarely known, and the technology needed to measure it routinely does not exist.
2. The overall shape of the defect. The peak amplitude response to a deep narrow defect is likely to be indistinguishable from that induced by a shallow but broad defect. For this reason, practitioners of this method must first classify defects into "size" categories in order to calculate penetration (metal loss). To avoid unsolvable complexity, "size" in practice generally refers to the surface diameter of an assumed circle expressed as a multiple of the nominal wall thickness T. In other words, the general assumption in peak amplitude methods is that defects all possess a circular section.

Amplitude methods are used widely; often involve very crude assumptions used to categorise defects according to laboratory-derived interpretation charts; and often involve subjective assessments. One particular assumption in use as noted is that all the casing surface defects are circular and have a diameter that is an integer multiple of the casing wall thickness T. When real defects are visually inspected this is shown to be a demonstrably unsatisfactory approach.

The process of generating additional interpretation charts for newly encountered casings is time-consuming and extremely expensive, involving among other steps machining of circular defects into casing samples. Aside from such complexities the laboratory conditions used to generate the charts are not replicated downhole, and matching the size, weight and grade of casing to downhole installations is no guarantee of matching the magnetic properties.

Furthermore it has proven difficult to replicate the dimensions of the synthetic defects in all casing sizes; and it is estimated that the uncertainty in the laboratory standard penetration data is about 10% absolute.

Care is needed to ensure that the data processing used in the laboratory and the field are identical in every respect but this is a potential problem in practice because of the potential for inconsistencies between the two processing environments.

Attempts have been made to augment physical laboratory defect data with the results of numerical modelling, but this is not satisfactory either. Reasons include:

1. Casing magnetic properties (specifically B-H curves) are an input to the model which therefore suffers essentially the same issue as the physical machining approach;
2. The models need to be validated against physical benchmarks which therefore cannot be completely eliminated; and
3. Modelling the response of each sensor as it is logged past a defect is computationally expensive and time-consuming.

Pattern Recognition/Machine Learning/Neural Net Methods

Such methods have been attempted in the pipeline inspection industry using pigs as outlined above. Pigs as explained are large enough to support the magnets and sensors needed to make the required tri-axial measurements and include electronics which are not subject to the same size and temperature constraints as casing inspection logging tools.

Pattern recognition methods aim to compute penetration in a one-step process without the need to classify the size or shape of the defect first. Ultimately, they rely on measures of similarity between physical defects and the corresponding MFL response. The similarity measures may be defined manually, or a machine learning algorithm can seek to extract them automatically. Regardless of the details they are empirical approaches not driven by measurement physics, and the results are only as good as the ground truth data needed to generate the transforms that connect inputs and outputs.

In other words, these methods rely on the availability of a library of MFL responses to physical defects; or virtual defects derived from a computer model. These methods when applied to pipelines often include recovery or "digging up" of the defect for visual inspection verification as part of a maintenance process. The same is very rare in the case of a well casing. The pattern recognition, machine learning and AI methods when attempted in cased boreholes therefore suffer many of the same drawbacks as already outlined.

In view of the economic and safety-related importance of casing defect inspection, and despite extensive historical attempts as outlined above, there is a clear need in the art for improvements in the accuracy, quality, cost, comprehensiveness and reliability of casing inspection techniques.

According to the disclosure hereof in a broad aspect there is provided a method of determining variations in wall thickness in an elongate, cylindrical, hollow, ferromagnetic tube defining a tube wall, comprising the steps of:

a) energizing the tube with an at least longitudinally extending magnetic field generated inside the tube that gives rise to near- or over-saturation of the tube wall material;
b) using a magnetic field-detecting logging tool to (i) detect two or more magnetic flux leakage signals generated inside the tube other than in the material of the tube wall, resulting from such energizing, at plural circumferential locations on the inner and/or outer surfaces of the tube and at a plurality of distances along the tube and (ii) generate two or more magnetic flux leakage data signals indicative thereof;
c) iteratively, one or more times, using a model of the relationship between the two or more magnetic flux leakage data signals generated in Step b) and the thickness of the tube wall to derive the thickness profile of the tube wall by relating a defect-free flux parameter representing a field strength defect offset in a magnetization plot of the tube averaged across two or more sensors of the logging tool and a maximum flux response within the defect measured by the logging tool to give rise to a first approximation ratio, forming part of the model, that is proportional to defect penetration;
d) inverting in accordance with the model to produce a defect profile which depends on the magnetic flux leakage signals without any external parameters;
e) determining the defect penetration by determining the maximum of the defect profile; and
f) generating one or more signals representing a wall thickness profile based on the defect penetration.

Such a method is highly successful in part because of the realization by the inventors that triaxial components of flux leakage resulting from casing defects may be derived from energizing of the casing using a uniaxial magnet; and the further realization that the longitudinal component contains adequate information to permit reconstruction of wall thicknesses in the majority of cases, thereby permitting considerable simplification of the signal processing required.

The method moreover takes advantage of the nature of the signals generated by a magnetic flux loss logging tool, that reliably may be transmitted using wireline.

As noted references herein to a "tube" preferentially are to casing, liner or production tubing installed in a downhole location; but it is believed that the method and apparatus of the invention are useable in other situations in which assessments of tube wall penetration are needed. Such situations include but are not limited to e.g. pipelines that may be surface pipelines, subterranean pipelines or subsea pipelines.

The method is demonstrably successful when considering known cylindrical, circular, cone and elliptical casing wall defects; and further is believed to be applicable to a wide range of other arbitrary defect shapes. This is because the inversion described herein is not shape-dependent, meaning it is applicable to virtually all defect shapes whether arbitrarily created or arising in field situations in which metal loss occurs.

Preferably Step a) of energizing the tube with an at least longitudinally extending magnetic field generated inside the tube includes operating, or permitting to operate, a source of an at least longitudinally extending magnetic field inside the tube supported in or by a magnetic field-generating logging tool. Such logging tools are known and save for the features essential for an understanding of the disclosure are not described in detail herein.

Further preferably the magnetic field-generating logging tool is or is operatively connected to the magnetic field-detecting logging tool. However it is also possible for the method successfully to operate when the source of the longitudinal magnetic field is deployed separately from the magnetic field-detecting logging tool, it being necessary only that the magnetic field-detecting logging tool is capable of detecting the generated magnetic flux leakage that has been influenced by the material of the casing wall.

Possibly therefore the source of the magnetic field itself does not perform a logging function per se. For convenience herein however any device supporting a source of a magnetic field used in the method disclosed herein may be referred to as a "magnetic field-generating logging tool".

The method optionally may include the step of causing conveyance of at least the magnetic field-detecting logging tool from a position remote from the tube to two or more locations, inside the tube, that are spaced from one another along the tube; and carrying out Steps a) and b) in respect of the respective two or more locations.

The magnetic field-detecting logging tool may as part of the method be caused to detect the magnetic field and generate signals indicative of it at the at least two locations.

Preferably the method includes supporting at least the magnetic field-detecting logging tool on wireline, that connects the logging tool to one or more items of equipment that are remote from the tube, during such conveyance. As is well-known in the oil and gas exploration arts wireline may be provided in significant lengths at a surface location for deployment from a rotatable drum far along a borehole. Following deployment and logging operations the wireline may be re-wound onto the drum in a manner withdrawing the logging tool(s) to the surface location.

Wireline is therefore highly suitable for permitting communications between at least the magnetic field-detecting logging tool and a surface location during practising of the steps of the method.

In more detail preferably the wireline connects at least the magnetic field-detecting logging tool to processing apparatus, that is remote from the tube, during carrying out of at least steps a) and b) of the method defined herein. In practice the magnetic field-detecting logging tool is likely to be connected to the processing equipment via wireline for the whole time of its deployment and operation to log and image casing defects.

The aforesaid two or more locations preferably are non-coincident with any casing collars (if present) forming part of the tube. This precaution advantageously avoids inaccuracies as may arise from attempting to log the tube wall thickness in the vicinity of casing collars.

Further for the avoidance of ambiguity preferably the tube is one of a plurality of serially interconnected tubes fixed in a subterranean location and defining a hollow column communicating with a surface location or with a further hollow column that is connected to a surface location. However it is not essential that serially connected tubes be provided or assessed using the disclosed method.

Conveniently the magnetic field-detecting logging tool includes a plurality of Hall-effect detectors of magnetic flux. Designs of such logging tools are known per se. Thus the method of the invention beneficially may be carried out using pre-existing logging equipment.

In particular the plurality of Hall-effect detectors of magnetic flux optionally are arrayed in a circular pattern defined circumferentially with respect to the magnetic field-detecting logging tool.

Also preferably the magnetic field-detecting logging tool includes one or more arms supporting one or more pads mounting at least one pad-mounted said Hall-effect sensor, the one or more arms being moveable from a retracted position in which the at least one pad-mounted Hall-effect sensor is spaced from the material of the tube; and a deployed position in which the pad contacts or lies closely adjacent the material of the tube, the method including causing movement of the one nor more arms between the retracted and deployed positions. The ability of the pad to keep the Hall-effect sensor a constant distance from the tube wall minimizes any flux variations due to sensor "lift-off" that otherwise might occur when the sensor is not kept at a constant distance from the tube wall.

In many embodiments the method disclosed herein is applied in real time during generation of the log signals as summarized above. However the method is tool-independent and data driven, meaning the steps of the method may if desired be carried out in respect of log signals generated (i.e. by Steps a. and b. disclosed herein) some time before the remainder of the steps are carried out. Only the casing internal diameter and the number of detectors need to be known. All other parameters of the logging tool and the casing may be unknown yet the method operates successfully nonetheless.

In some conceivable circumstances the magnetization law applying to the material of the casing wall will be linear; but in the case of ferromagnetic casing materials a non-linear magnetization law applies. Moreover the casing exhibits hysteresis. In the non-linear case preferably the model of the relationship between the two or more magnetic flux leakage signals generated in Step b) and the tube wall thickness is of the form:

$$\nabla_2 \cdot (\mu(H_1)\vec{H}_1|_{z=\zeta}\zeta) = 0 \qquad (1)$$

wherein $\mu(H_1)$ is magnetic permeability of the ferromagnetic material of the tube; $\vec{H}_1$ is the magnetic field within the ferromagnetic material of the wall of the tube; $\zeta$ represents the nominal thickness of the tube wall; z is the thickness direction of the tube wall; and $\nabla_2$ is the gradient operator with respect to the ferromagnetic material of the wall of the tube.

In such a case Step c) of the method optionally includes the step g) of integrating the expression (1) with a magnetic field $H_2$ derived from the magnetic flux leakage signals generated in Step b) and the magnetic permeability $\mu(H_2)$ of the interior of the tube other than the material of the tube wall.

Preferably the magnetic permeability $\mu(H_1)$ is approximated in accordance with the expression $$\mu(H) = \alpha\left(1 + \frac{H_0}{H}\right)$$

in which $H_0$ is a detect-free flux parameter representing a field strength defect offset in a magnetization plot of the tube averaged across two or more sensors of the logging tool and H is a maximum flux response within the defect measured by the logging tool.

Conveniently at least Steps c) to e) of the disclosed method are carried out using a programmed processing apparatus. Such apparatus may be, or may include, a digital computer that typically would be at a surface location (and may be spaced a significant distance from the tube under investigation).

The method may further include the step of h) generating one or more images of the tube wall thickness profile from the one or more signals generated in Step f). Such images may be interpretable by humans and/or may be interpretable by machines such as programmable computers carrying out one or more image recognition, quantification or assessment methods.

Also the method optionally may include the step of i) transmitting, storing, saving or processing the one or more signals generated in Step f) or data representative thereof.

Similarly the method may include the step j) of transmitting, storing, saving, processing or printing one or more said images of the tube wall thickness.

Apparatus for carrying out a method as defined herein may include a source of a magnetic field that is capable of extending at least longitudinally along the interior of the tube, the source being moveable along the interior of the tube; a magnetic field-detecting logging tool that is moveable along the interior of the tube and that is capable of carrying out Step b) of the method; and processing apparatus to which the magnetic field-detecting logging tool is operatively connected or connectable and that is capable of carrying out at least Steps c) to e) of the method.

Optionally the processing apparatus may be capable of also carrying out Step f) of the method. The processing apparatus in a typical case would be programmable and non-limitingly may be embodied as a digital computer.

Conveniently the magnetic field-detecting logging tool of the apparatus may include a plurality of Hall-effect detectors of magnetic flux.

Preferably the plurality of Hall-effect detectors of magnetic flux are arrayed in a circular pattern defined circumferentially with respect to the magnetic field-detecting logging tool.

Also preferably the apparatus includes one or more arms supporting one or more pads mounting at least one pad-mounted said Hall-effect sensor, the one or more arms being moveable from a retracted position in which the pad-mounted Hall-effect sensor is spaced from the material of the tube; and a deployed position in which the pad contacts or lies adjacent the material of the tube, the method including causing movement of the one nor more arms between the retracted and deployed positions.

Further preferably the source is supported in or by the magnetic field-generating logging tool specified in the method. Further preferably the magnetic field-generating logging tool and the magnetic field-detecting logging tool are common one to the other or are secured one to the other.

The apparatus disclosed herein preferably includes at least one logging tool as defined supported by and operatively connected using wireline. Optionally the wireline interconnects the magnetic field-detecting logging tool and the processing apparatus.

The disclosure hereof indicates linear dimensions in units of feet and inches as is conventional in the oil and gas industries. These may be converted to SI values through use of the well-known conversion factor 1 inch=25.4 mm.

There now follows a description of preferred embodiments, by way of non-limiting example, with reference being made to the accompanying drawings in which.

Figure 6B:
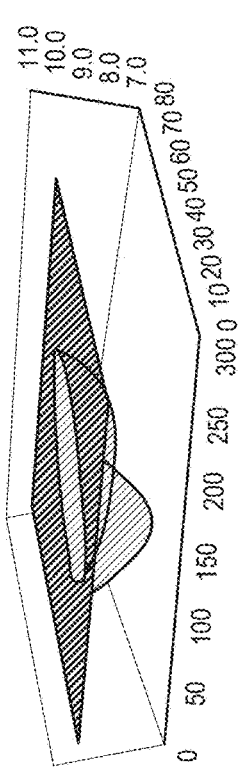
Figure 6B:
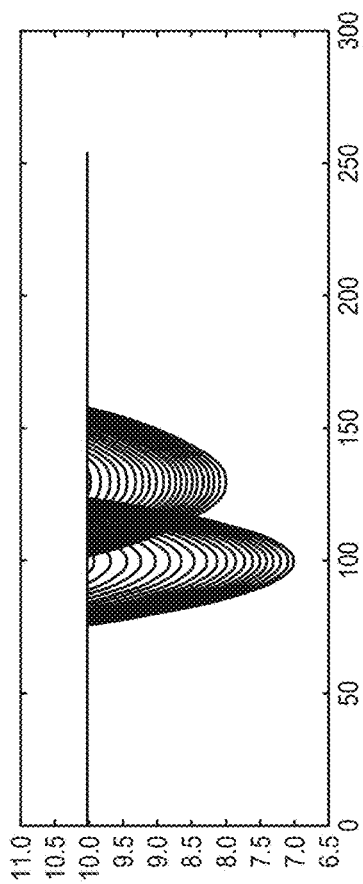
Figure 6A:
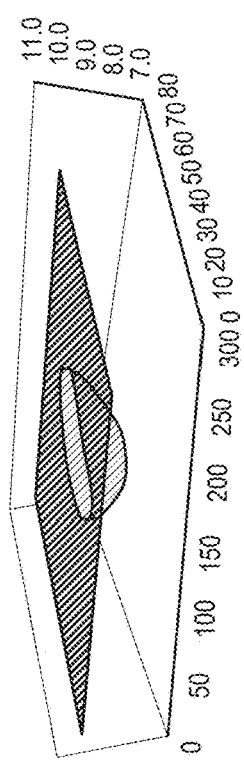
Figure 6A:
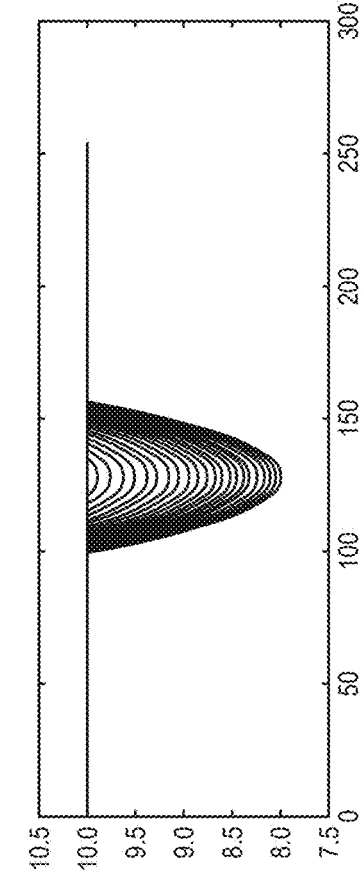
Figure 7A:
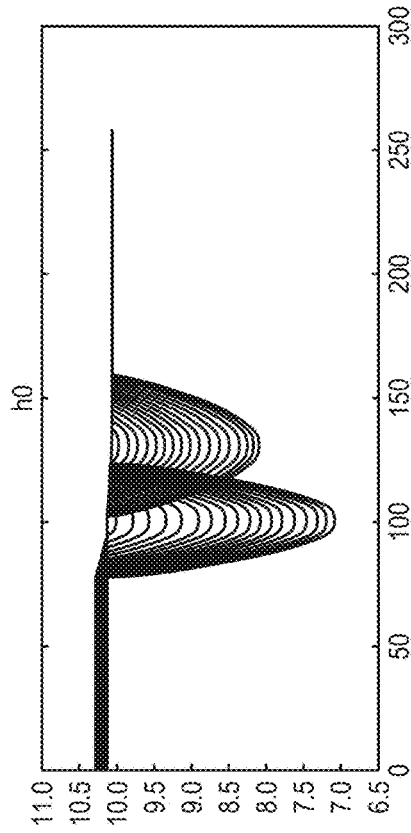
Figure 7B:
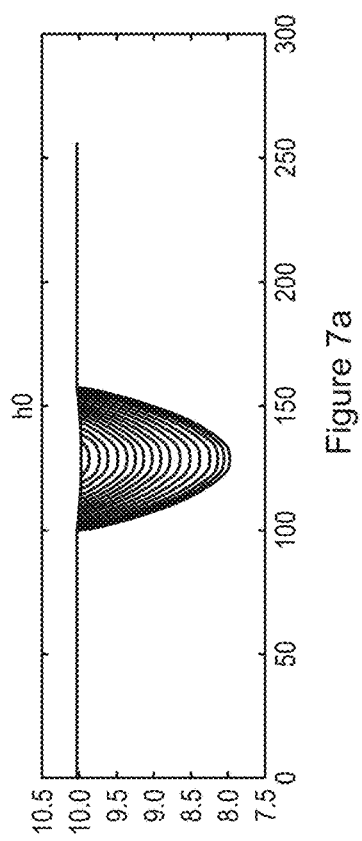
Figure 7C:
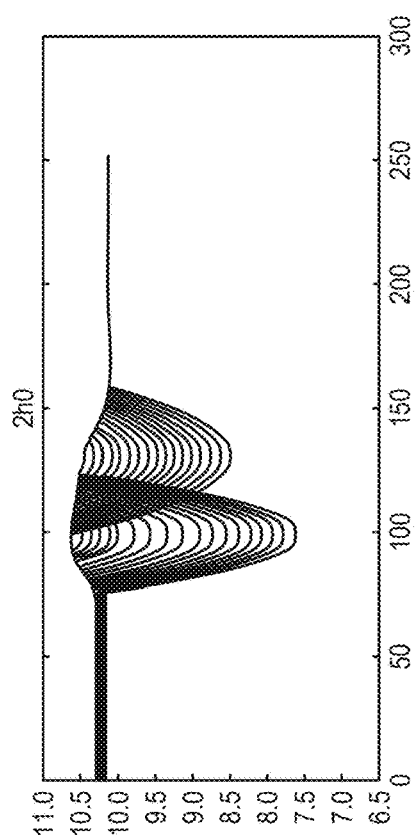
Figure 7D:
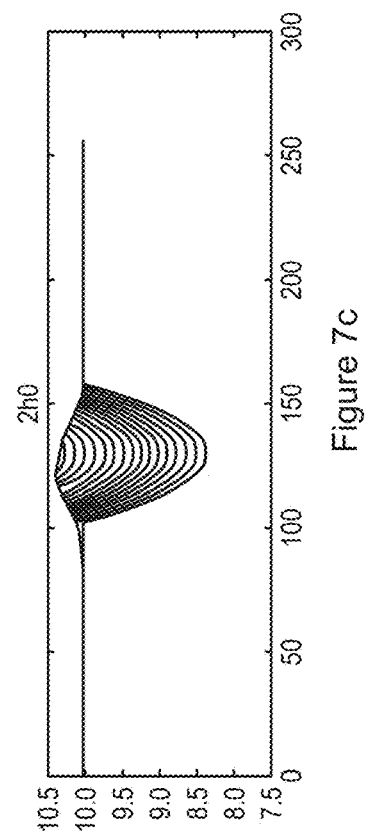
Figure 7F:
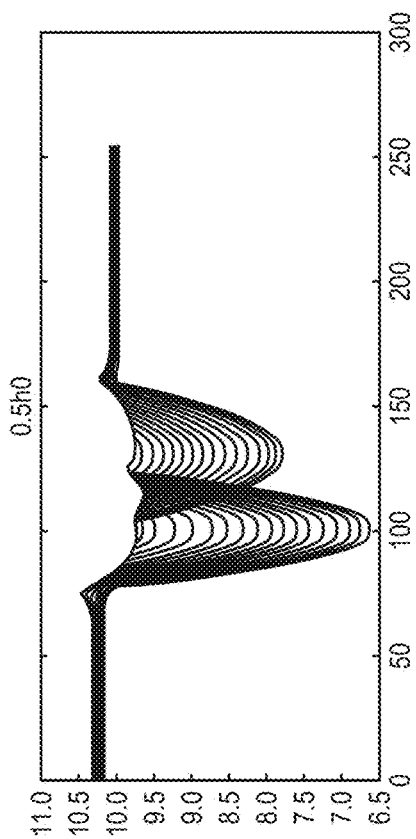
Figure 7E:
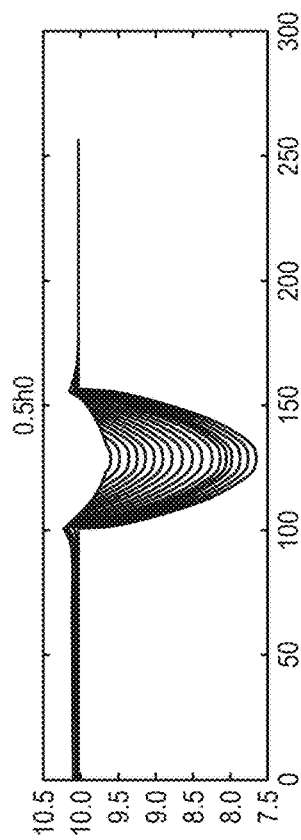

FIGS. 6a and 6b respectively illustrate two synthesized wall material defects in the form of an isolated segment of a sphere (FIG. 6a) and two overlapping semi-sphere shape (FIG. 6b);

FIGS. 7a, 7b, 7c, 7d, 7e and 7f respectively illustrate calculated tube wall profiles for the synthesized wall material defects of FIGS. 6a and 6b, using differing values of a defect-free flux parameter $H_0$ explained herein and illustrating a phenomenon of impermissible profiles; and FIGS. 8a and 8b are versions of the FIG. 6 profiles following constraining of the model to eliminate inadmissible profiles, and showing the accuracy of the method.

NON-LIMITING APPARATUS AND DEPLOYMENT

Figure 1:
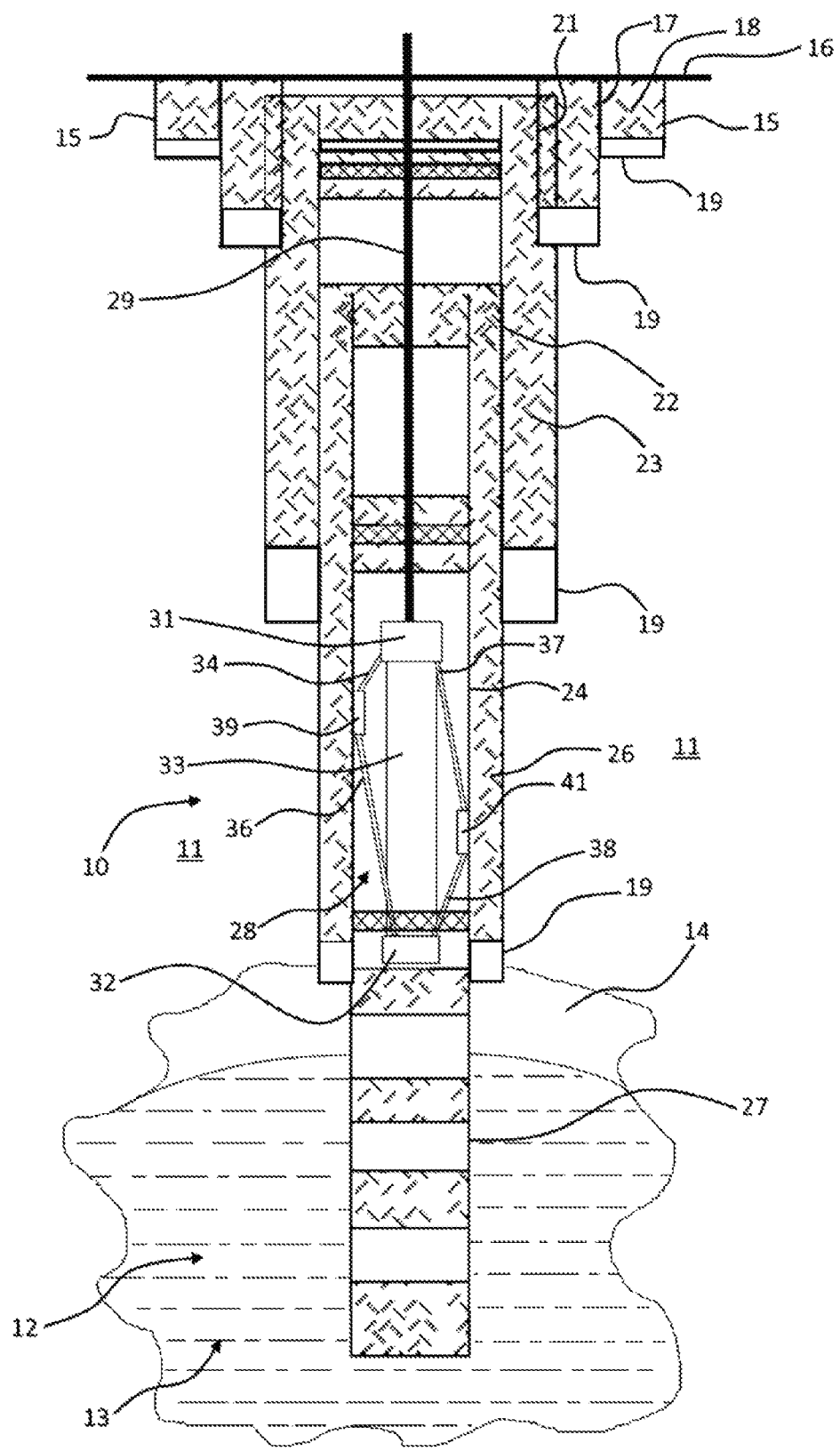
FIG. 1 is a schematic, partly sectioned view of a borehole-casing system including inserted therein a logging tool that is suitable for carrying out the steps of the method disclosed herein.

Referring to the figures and especially FIG. 1, one form of borehole-casing system 10 is schematically illustrated in which a borehole penetrates a formation 11 including a reservoir 12 containing liquid hydrocarbons 13 and, overlying it, a volume of gas 14.

The wall 15 of the borehole is for clarity omitted from FIG. 1 over most of the length of the illustrated system, but can readily be envisaged.

FIG. 1 shows the borehole-casing system 10 in an exaggeratedly shortened form, for convenience. In practice the length of the system 10 from a surface location 16 (that may be e.g. the ground or an ocean floor) to the downhole end of production tubing 27 may be several hundred or several thousand feet.

At its most uphole end the borehole is lined by one or more relatively short annuli 17, 18 of cement that encircle a (non-limiting) nominal 30-inch diameter length 21 of hollow, cylindrical casing between the outer wall of the casing 21 and the borehole wall 15.

A (non-limiting) nominal 16-inch diameter casing length 22 is hung off the downhole end of the 30-inch casing, overlapping it for a short length and extending in a downhole direction. A cement annulus 23 lies externally of the 16-inch casing 22 and encircles it.

A further casing length 24 of (non-limiting) nominal 13⅜-inch diameter is similarly hung from the downhole end of the 16-inch casing and surrounded by a cement annulus 26. Production tubing 27 that in the non-limiting example shown is of nominal 9⅝-inch diameter is hung off the downhole end of the 13⅜-inch diameter casing and is perforated in any of a variety of ways to permit the flow of fluids from the reservoir 12 in a per se known manner.

Various forms of casing collar 19 that are illustrated schematically in FIG. 1 serve to contain the cement as it is pumped downhole during construction of the borehole-casing system and (depending on the precise design) to secure the casing lengths one to another as a series.

The borehole-casing system of FIG. 1 as noted is shown highly schematically, for purposes of exemplifying environments in which the method and apparatus of the disclosure may be used. A great number of variations on the arrangement of FIG. 1 are possible within the scope of the disclosure and, as mentioned, use of the method and apparatus is not confined to subterranean borehole environments as illustrated.

An elongate magnetic flux leakage logging tool 28 is shown in schematic form in FIG. 1 suspended on a length of wireline 29 having been deployed from a surface location to deep inside the borehole 15. The wireline extends from a surface location where it is dispensed from a storage drum (that is omitted for simplicity) and connected (or at least connectable) to processing apparatus that processes signals generated by the logging tool 28. The wireline is to this end connected in a manner capable of transmitting signals generated by the logging tool 28. Means of achieving this will be known to the person of skill in the art.

The wireline 29 also preferably is connected in a manner permitting the transmission of surface-generated operational commands to the logging tool 28 and, in at least some embodiments, operational power for powering the tool 28.

The logging tool 28 is shown in position surveying the inner cylindrical wall of the casing (tube) length 24 in accordance with the method disclosed herein but may be deployed for example in the production tubing 27 the internal diameter of which is less than that of the casing 24. Features of the logging tool 28 permitting such operation are known per se and are described herein to the extent needed for an understanding.

The logging tool 28 includes spaced from one another at respective in-use uphole and downhole ends respective opposite magnet poles 31, 32. The poles 31, 32 are such as to cause a magnetic field to be emitted externally of the logging tool in a manner extending longitudinally along the casing 24 that is under inspection. The method of the invention relies on analysis of the longitudinal components of such a field and disregards any non-longitudinal components in a manner rendering the model used in the method solvable using the data signal outputs of the logging tool 28.

In the illustrated FIG. 1 embodiment the poles 31, 32 are interconnected by a rigid, elongate cylindrical body 33 that depending on the precise logging tool design may contain e.g. processing or signal conditioning electronics, one or more power sources or power convertors, one or more motors for causing deployment of support arms described below, and shielding preventing the creation of a magnetic short circuit between the poles 31, 32. Any power sources or power converters if present may for example be powered by power signals transmitted using the wireline 29.

The poles 31, 32 may be permanent magnets or may be electromagnets powered by a power source as aforesaid. Regardless of the precise arrangement the poles supported in the logging tool 28 amount to a magnetic field-generating logging tool as referred to herein.

The illustrated logging tool 28 includes pairs of extensible and retractile arms 34, 36, 37, 38. Each arm of each respective pair 34, 36; 37, 38 is pivotably fixed at one end to the cylindrical body 33 and at the other end to one of a plurality of pads 39, 41. The arrangement of the arms and the pads is such that each arm 34, 36, 37, 38 is moveable between a retracted position in which it lies close to or recessed within the cylindrical body 33 and an extended position protruding therefrom. As a result the pads 39, 41 also are moveable between retracted positions lying close to or recessed within the cylindrical body 33 and extended positions spaced radially outwardly therefrom as illustrated.

This permits the pads 39, 41 in a per se known manner to be caused to engage or at least lie closely adjacent the wall of the casing regardless, within a range of adjustment permitted by the arm and cylinder dimensions, of the internal diameter of the casing.

Each pad supports at least one detector of magnetism that in the preferred embodiment is a Hall-effect sensor. Such a sensor generates electrical signals the amplitude of which is in proportion to an incident magnetic field. The sensors are connected or connectable so that their output signals may be transmitted to the remainder of the logging tool 28 and thence, as necessary following processing in the logging tool 28, to the surface location via the wireline 29.

The arms 34, 36, 37, 38 may be powered to move between the described retracted and extended positions through operation of one or more springs or other force-generating means supported within the cylinder 33.

The arms 34, 36, 37, 38, the pads 39, 41, the Hall-effect sensors and any springs, etc., supported in the cylinder amount to a magnetic field-detecting logging tool. It will be apparent that the Hall-effect sensors in such an arrangement may be maintained in contact with the casing wall, regardless of its internal diameter, during deployment or the logging tool 28. In consequence when the logging tool 28 reaches a depth along the borehole 15 at which surveying of the integrity of the casing wall is to take place the arms 34, 36, 37, 38 are in appropriately extended positions as shown. In other words the Hall-effect sensors supported on the pads 39, 41 are arranged to be deployed in the magnetic field $H_2$ inside the casing that results from interaction of the emitted magnetic field with the casing wall material and in particular any defects in it.

In the illustrated arrangement the magnetic field-detecting logging tool and the magnetic field-generating logging tool are formed as parts of one and the same component and therefore are secured one to the other. However this need not be the case, and it is possible to devise arrangements in which a magnetic field-generating device, in the form of a sub supporting permanent magnet poles, may be deployed separately from magnetic field-detecting logging apparatus (albeit that the detecting logging apparatus needs to be operated before the magnetic field generated by the generating device diminishes such that useful signal measurements could not be recorded).

Figure 3:
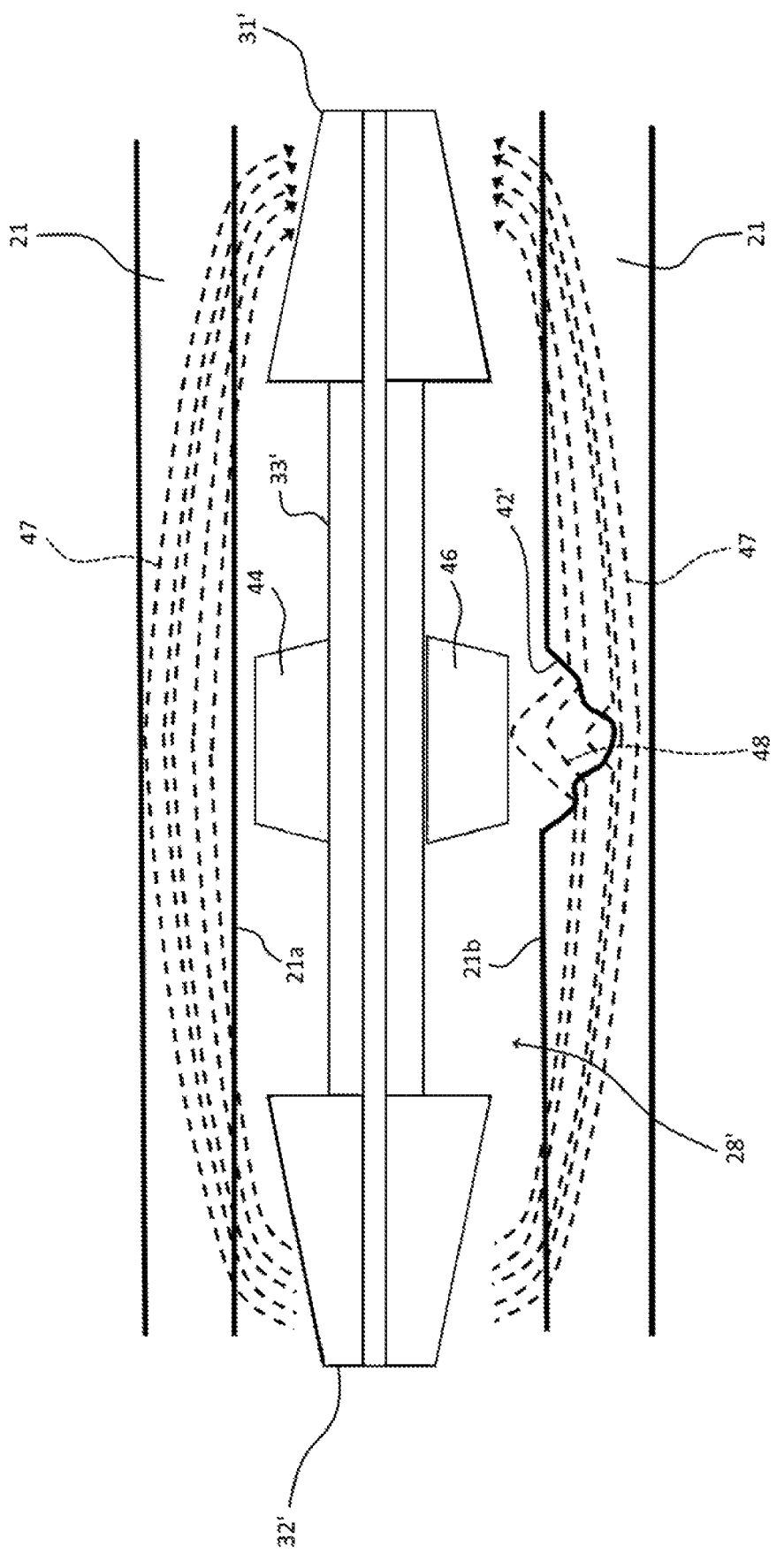
FIG. 3 shows in schematic form another logging tool that is suitable for carrying out the method steps disclosed herein and illustrating the nature of magnetic flux in the vicinity of a region of wall depletion as illustrated in FIG. 2.

In some magnetic-field detecting logging tools two field-generating tools or sources are provided. One source is a permanent magnet which is formed by multiple pieces that preferably define a cone shape. The other magnetic field source is a local magnet mounted on the Hall-effect sensors and designed to help discriminate an internal defect (ID) from an external defect (OD). In an embodiment the tool may have two sets of Hall effect sensors: corrosion sensors and discriminator sensors. In some embodiments the latter have the local magnet built on top of them. Such arrangements are omitted from FIG. 1, which shows generic magnets 31, 32 in a schematic form. FIG. 3, described hereinbelow, illustrates one of numerous possible alternative magnet and sensor arrangements.

In the embodiment shown in FIG. 1 the pads 39, 41, and hence the Hall-effect sensors, are located at longitudinally spaced locations on the respective pairs of arms 34, 36 and 37, 38. However this need not be the case, and instead the Hall-effect sensors could be located at the same longitudinal position along the logging tool 28.

Two sets of arms 34, 36, 37, 38 and associated pads 39, 41 are shown in the illustrated embodiment, but other numbers of pads, arms and Hall-effect sensors may be provided in other embodiments. If three or more pad/sensor combinations are provided these could be arranged in a circular pattern that is defined by or related to a circumference of the logging tool 28. This may be so regardless of whether the pads are all at the same longitudinal position along the logging tool 28.

Moreover it is not necessary for the magnetic field detectors to be deployable and retractile. On the contrary it is possible to devise embodiments in which the diameter at which the magnetic field detectors such as Hall-effect sensors are mounted is a fixed distance relative to the remainder of the logging tool 28, with such a logging tool then being dedicated to the surveying of a chosen size of casing. An example of such an arrangement is illustrated in FIG. 3.

Figure 2:
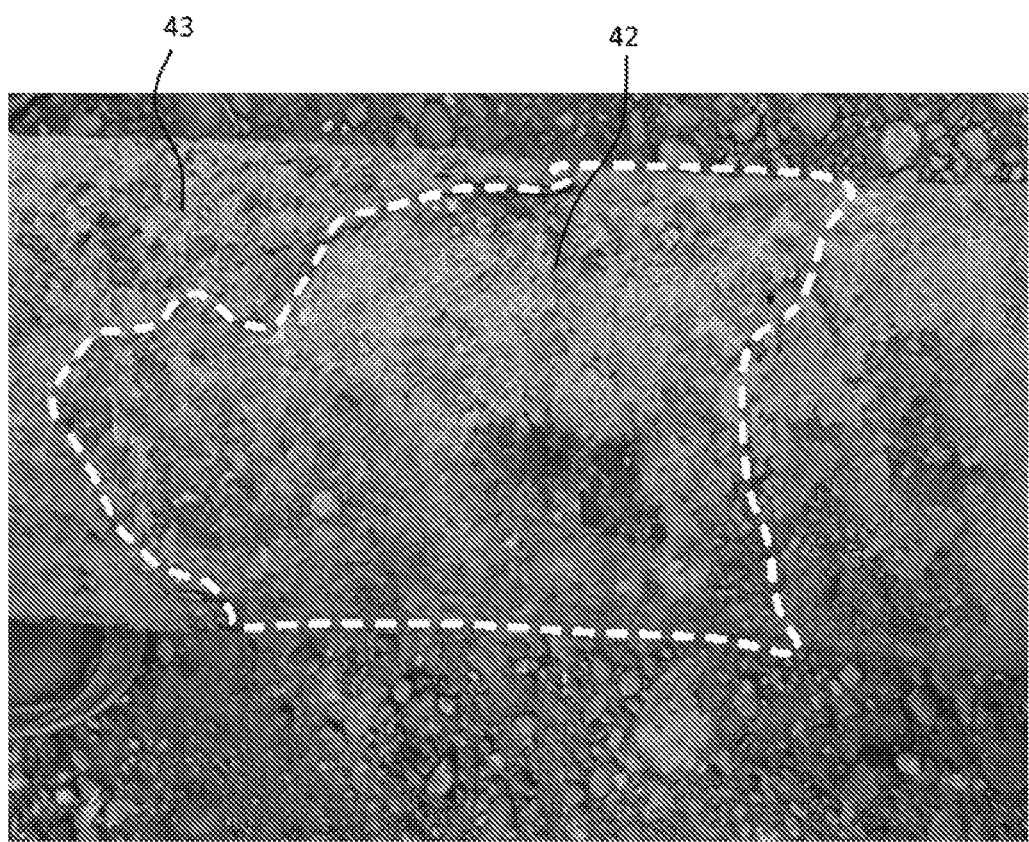
FIG. 2 is a photograph of an example in a horizontally sectioned length of casing of wall depletion, outlined in superimposed dotted lines, caused by corrosion.

As shown in FIG. 2 by a dotted outline, a region 42 of reduced thickness of a casing wall 43 caused by corrosion in practice will never adopt the assumedly circular shape used in prior art casing defect assessment methods. On the contrary such regions 42 will adopt highly randomized peripheral shapes and will not be of constant material depletion depth.

FIG. 3 illustrates in a schematic form another design of magnetic flux leakage logging tool 28'. Tool 28' differs from tool 28 of FIG. 1 in that firstly the Hall-effect sensors are not mounted on moveable pads which therefore are dispensed with. Instead the Hall-effect sensors 44, 46 are secured on the cylindrical body 33' of the logging tool 28'. As a result the Hall-effect sensors 44, 46 are positioned in an essentially fixed relationship relative to the casing 21 within which the logging tool 28' is deployed.

FIG. 3 shows variant forms of the magnet poles 31', 32' that each adopt a frusto-conical shape. Other variants on the designs of the magnet poles are also possible.

FIG. 3 illustrates in a non-limiting way the effect of depletion of the material of the casing on the lines 47 of magnetic flux that extend between the magnet poles 31', 32'. As is visible in FIG. 3 on a side 21a of the casing 21 where the material of the casing wall is intact the flux lines 47 extend smoothly along the casing wall metal without significant perturbation. As a consequence the Hall-effect sensor 44 adjacent wall side 21a detects no magnetic flux.

In contrast the material of casing wall side 21b has been depleted and gives rise to a region 42' of reduced metal thickness. As illustrated this causes distortion of the flux lines 47 in the region 48. The flux leaks into the hollow interior of the casing in a manner that causes activation of the Hall-effect sensor 46 so as to generate a signal. Such a signal following treatment in accordance with the method disclosed herein is accurately indicative of the extent of depletion of the metal of the casing wall 21b.

FIG. 3 is intended to be merely illustrative and is not limiting. In embodiments the shapes and positions of the magnet poles, the Hall-effect (or other) sensors of magnetic flux, the nature of the casing wall 21, the shape and depth of any depleted zone 42' and the density of the flux lines 47, 48 may vary from the exemplary versions shown.

Combinations of embodiments as would occur to the person of skill in the art are possible. As one example in this regard the logging tool of FIG. 1 may for instance include magnet poles of the type shown in FIG. 3. Another possibility is for the fixed flux sensors 44, 46 of FIG. 3 to be provided in a tool design that is otherwise generally similar to that of FIG. 1.

Notwithstanding the possibilities for variation of the hardware using which the method of the invention may be practised, the method in its basic form involves steps of, following deployment of the logging tool 28 to a position such as that shown in FIG. 1 at which logging of the casing wall material is required:

a) energizing the tube with an at least longitudinally extending magnetic field generated inside the tube;
b) using a magnetic field-detecting logging tool to generate two or more magnetic flux signals generated inside the tube other than in the material of the tube wall resulting from such energizing at plural circumferential locations on the inner surface of the tube and at a plurality of distances along the tube;
c) iteratively, one or more times, using a model of the relationship between the two or more magnetic flux signals generated in Step b) and the thickness of the tube wall to derive the thickness profile of the tube wall by using the defect-free flux averaged across the sensors relating this defect offset to the maximum flux response within the defect as first approximation ratio proportional to the defect penetration, the iteration including:
d) using the estimate of the defect-free flux parameter;
e) inverting in accordance with Equation (6) hereof for the defect profile which depends only on the available flux data without any external parameters. Such action may include calculating and taking account of a metric that is representative of the magnitude of one or more physically inadmissible features in or forming part of the thickness profile;
f) determining the defect penetration by taking the maximum of the reconstructed defect profile; and
g) generating one or more signals representing the thickness profile resulting from use of selected defect-free flux parameter as the thickness profile of the wall of the tube.

Modelling and Simplifying Assumptions

The following explains such steps in more detail.

Figure 4:
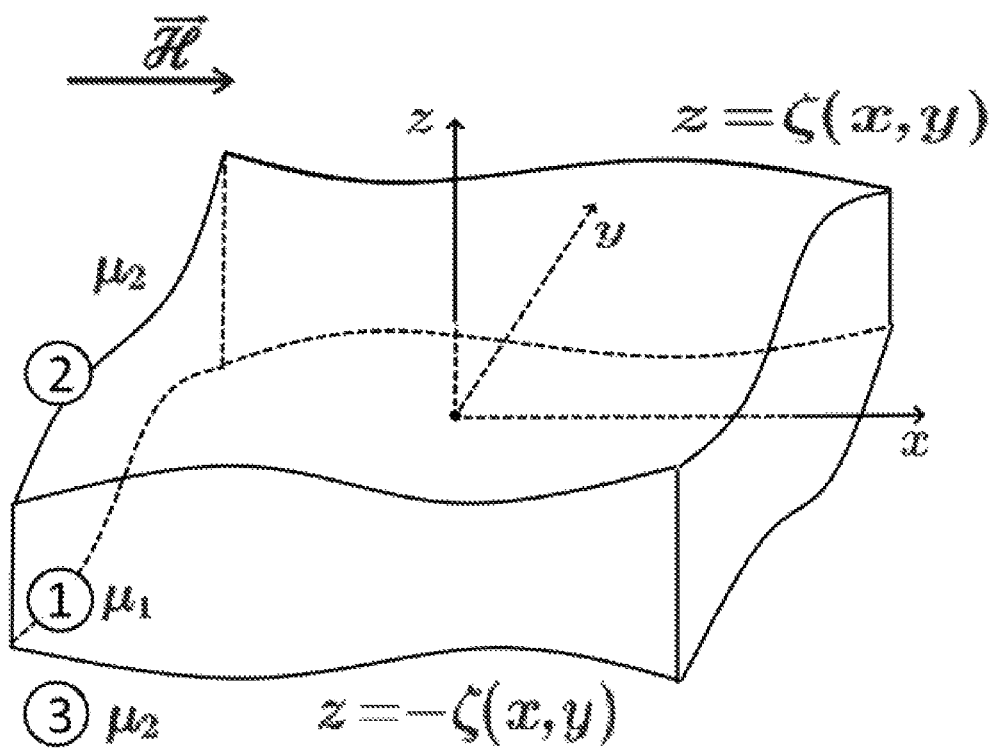
FIG. 4 shows in schematic form the mirror-symmetric modelling of the wall material of casing or liner as used in the method.

The hall-effect (or other magnetic field detecting) sensors exemplified in FIG. 1 generate electrical signals in proportion to the magnetic field detected inside the casing. The longitudinally extending field components (i.e. those extending in the longitudinal direction along the casing) are processed to generate signals indicative of the casing wall thickness profile $\zeta$ by practising the following steps:

Making use of a large-scale defect assumption explained below, the magnetic field is sensitive to the casing thickness profile but not to the inner and outer surface profiles independently. The method therefore relates the analytical consideration to the case of mirror-symmetric layers as shown in FIG. 4 in which a ferromagnetic layer is confined between two surfaces $z=\zeta(x,y)$ and $z=-\zeta(x,y)$, where the $(x,y)$ plane is the middle plane of the layer and the z-axis is orthogonal to it. The half-thickness of the undamaged layer is $\zeta_0$. The uniform external magnetic field is $\mathcal{H}$ applied along the x-axis. The long-wavelength (or large-scale) approximation conditions have the following form:

$$L >> \zeta, |\nabla_2 \zeta| << 1,$$

where L is the characteristic lateral scale (width) of a defect. $\nabla_2$ and $\Delta_2$ are gradient and Laplace operators respectively, and the index 2 indicates the two-dimensional versions of them calculated with respect to x and y coordinates.

The Maxwell equations for this system are:

$$\begin{cases} \nabla \times \vec{H}_j = 0, \\ \nabla \cdot \vec{B}_j = 0, \end{cases}$$

with boundary conditions $$\vec{H}_{1\tau} = \vec{H}_{2\tau}, B_{1n} = B_{2n}.$$

Here the subscripts j={1,2} indicate the ferromagnetic layer and the surrounding material respectively (FIG. 2); $\vec{B}_j$ is the magnetic flux density, $$\vec{B}_j = \mu_j \vec{H}_j; \tag{1}$$

and $\mu_j$ is magnetic permeability. For ferromagnets $\mu=\mu(H)$, where $H=|\vec{H}|$. Since the magnetic permeability of a ferromagnet is considerably larger than that of the surrounding material, $$\frac{\mu_1}{\mu_2} \gg 1$$

To the leading order of approximation, the flux of the magnetic field is captured within the ferromagnetic layer, i.e.

$$\nabla_2 \cdot (\int_{-\zeta}^{\zeta} \vec{B}_1 dz) = 0 \quad (2)$$

and $$\nabla_2 \cdot (\int_{-\zeta}^{\zeta} \mu(H_1) \vec{H}_1 dz) = 0 \quad (3)$$

To the leading order, expression (3) is equivalent to $$\nabla_2 \cdot (\mu(H_1) \vec{H}_1 |_{z=\zeta}) = 0 \quad (4)$$

Integration of Equation (4) with a given field $\vec{H}_2$ (which is to be measured) and magnetic permeability $\mu(H_2)$ allows modification of the signals to a form reconstructing the surface profile. If the magnetization law is linear ($\mu=\text{const}$), the expression can be simplified:

$$\nabla_2 \cdot (\vec{H}_1 |_{z=\zeta}) = 0$$

However, in most real systems, the magnetization law is non-linear as mentioned. This would lead to a considerable increase in the complexity of the integration of Equation (4) in the absence of the method steps disclosed herein.

Non-Linear Magnetisation Law

Figure 5:
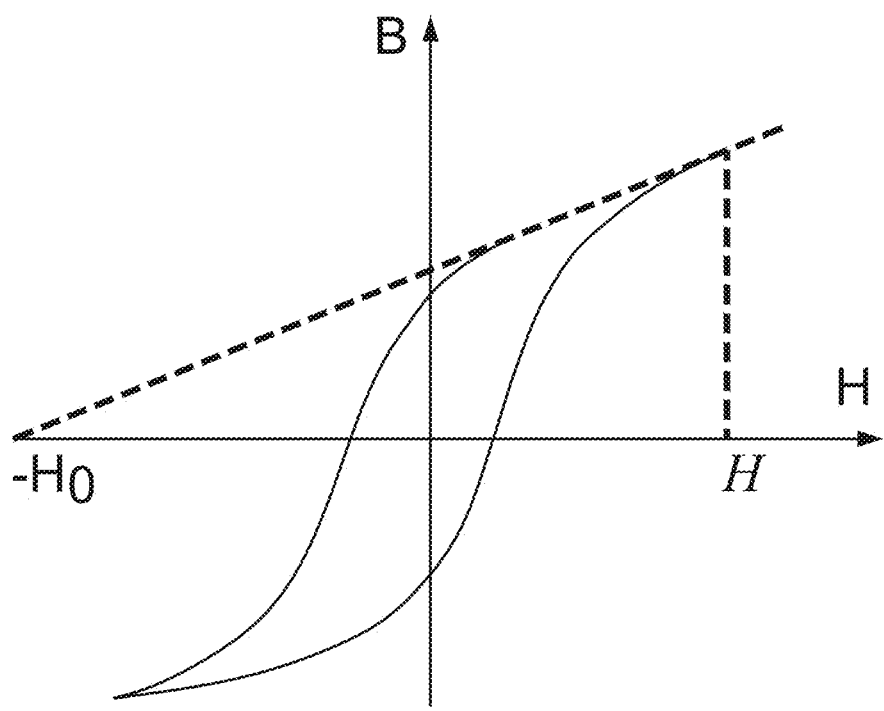
FIG. 5 is a plot of flux density against field strength in a ferromagnetic material such as the wall material of casing or liner, and illustrating the non-linear nature of the magnetization law of such a material.

A characteristic feature of ferromagnetic materials is hysteresis, illustrated by the solid magnetization curve in FIG. 5. This can lead to a loss of uniqueness in the solution of the profile-reconstruction problem. To minimize the impact of non-uniqueness, MFL tools are designed to operate where the magnetization is at or just below saturation. Hysteresis does not affect the signal here, but the magnetization law may still be significantly non-linear in this region.

Nonetheless, non-linear-magnetization problems can in accordance with the method be addressed for large-scale defects because the magnetic field ii within the ferromagnetic layer deviates only slightly from the field of the undamaged layer $\mathcal{H}$. For H close to $\mathcal{H}$, one can approximate the magnetization law as:

$$B(H) = \alpha(H + H_0),$$

where $\alpha$ and $H_0$ are parameters of the approximation. The expression for the magnetic permeability can therefore be cast as:

$$\mu(H) = \alpha \left(1 + \frac{H_0}{H}\right) \quad (5)$$

$H_0$ may be referred to as the Defect Free Flux (DFF). This can be inferred from the MFL scan data, as explained in the following section.

Numerical Determination of the Approximation Parameters

In MFL surveys the exact dependence B(H) is generally unknown. The characteristic magnetization law for wellbore casing depends on the grade of steel used for its manufacture, the manufacturing process and its stress state which is unknown. Parameters of the magnetization law can be found experimentally, but that would require the DFF to be determined for the specific type of casing prior to inspection.

In embodiments of the approach disclosed herein the parameters of magnetization are determined within an inversion process which reconstructs the thickness profile by minimizing physically inadmissible features of the calculated profile. Inadmissible features resulting from an incorrect magnetization law disappear when the correct law is used. Minimizing the total volume of positive defects (metal gains) produces good results, although casing connectors (such as collars) must be excluded from this part of the process.

Re-writing Equation (4) taking account of Equation (5) gives:

$$\nabla_2 \left( \alpha \left(1 + \frac{H_0}{H}\right) \vec{H} \Big|_{z=\zeta} \right) = 0 \quad (6)$$

Since $\alpha$ is constant, this may be simplified as:

$$\nabla_2 \left( \left(1 + \frac{H_0}{H}\right) \vec{H} \Big|_{z=\zeta} \right) = 0 \quad (7)$$

Only the DFF parameter ($H_0$) has a significant effect on the results. If $H_0$ is chosen incorrectly, the calculated profile $\tilde{\zeta}$ will not match the actual surface profile $\zeta$. Moreover, the cumulative integration error $\delta = \tilde{\zeta} - \zeta$ in the area near the defect can result in the uplift of the calculated surface profile above the undamaged level $\zeta_0$, which is physically inadmissible. Based on the foregoing, $H_0$ is determined by:

1. Selecting an initial arbitrary value of $H_0$.
2. Calculating the surface profile.
3. Finding the quantitative norm of inadmissible features (surface uplifts), $$\int dx \int dy (\tilde{\zeta}|_{z>\zeta_0} - \zeta_0 + |\tilde{\zeta}|_{z>\zeta_0} - \zeta_0|) \quad (8)$$

4. Changing the value of $H_0$ in a way that leads to the minimization of norm (8).

Derivation of $H_0$

The inversion algorithm was validated in the first instance using flux data from a numerical model independently of the analytical model used in the inversion. It was used to simulate the MFL response to a series of sphere segment defects with different values for the H field. A non-linear magnetization law and an applied U-field were specified. FIG. 6 shows two examples: an isolated sphere segment and two overlapping semi-sphere defects.

The results of the inversion procedure are shown in FIG. 7 for different values of the parameter $H_0$ as indicated in the figure (i.e. $H_0 = \tilde{H}_0$ (top, FIGS. 7a and 7b), $\tilde{H}_0 = 2\tilde{H}_0$ (middle, FIGS. 7c and 7d) and $H_0 = 0.5\tilde{H}_0$ (bottom, FIGS. 7e and 7f), where $\tilde{H}_0$ is the reference value). Parameter values that do not correspond to the real magnetization law produce implausible metal-gain in the reconstructed profiles around the defect area. When $H_0$ is overestimated the uplifts are on the sides of the defect area (displaced from the defect in the y-direction), and for underestimated $H_0$ the uplifts are before and after the defect along the casing (displaced in the x-direction). Any 1D minimization algorithm can be used to find the optimal $H_0$; the Nelder-Mead or Broyden-Fletcher-Goldfarb-Shanno algorithms were found to be adequate, for example.

FIG. 7 in summary shows the effect of constraining the model so that inadmissible results are excluded from the output.

The final reconstruction results and $H_O$ values are shown in FIG. 8. The error in reconstructed penetration is less than 5% absolute.

The FIG. 8 results are presented in graphical form but may just as readily be made available as e.g. further electrical signals.

These results for wall thickness ζ therefore may be transmitted, plotted, displayed, saved, interpreted (either by eye or using e.g. a machine recognition technique) and/or processed in numerous ways.

It is clear from the foregoing therefore that following operation of a logging tool such as tool 28 or 28' as described and processing of the signals output by the Hall-effect sensors in the manner explained above the result is a modelled wall thickness profile that is highly realistic. As noted the signal processing simplifications, to limit to longitudinal components of the detected magnetic field; and the constraint to remove impermissible results, make the method viable and considerably more accurate than prior art methods. The method therefore represents a significant advance in the effort to avoid the deleterious effects of casing wall corrosion damage and metal loss Moreover as mentioned the described method can be employed in other forms of tube albeit with modification as necessary of the deployment and signal transmission aspects to suit the different environments of such tube types.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A method of determining variations in wall thickness in a tube defining a tube wall, wherein the tube is elongate, cylindrical, hollow and ferromagnetic, the method comprising steps of:
   a) energizing the tube with an at least longitudinally extending magnetic field generated inside the tube that gives rise to near- or over-saturation of a material of the tube wall;
   b) using a magnetic field-detecting logging tool to (i) detect two or more magnetic flux leakage signals generated inside the tube other than in the material of the tube wall, resulting from such energizing, at plural circumferential locations on an inner surface and/or an outer surface of the tube and at a plurality of distances along the tube and (ii) generate two or more magnetic flux leakage data signals indicative thereof;
   c) iteratively, one or more times, using a model of a relationship between the two or more magnetic flux leakage data signals generated in the step b) and the thickness of the tube wall to derive a thickness profile of the tube wall by relating a defect-free flux leakage response representing a field strength defect-free offset in a magnetization plot of the tube averaged across two or more sensors of the magnetic field-detecting logging tool and a maximum flux leakage response in the presence of a defect measured by the magnetic field-detecting logging tool to give rise to a first approximation ratio, forming part of the model, that is proportional to defect penetration;
   d) inverting in accordance with the model to produce a defect profile which depends on the magnetic flux leakage signals without any external parameters;
   e) determining the defect penetration by determining a maximum of the defect profile; and
   f) generating one or more signals representing a wall thickness profile based on the defect penetration.

2. The method according to claim 1 wherein the step a) of energizing the tube with an at least longitudinally extending magnetic field generated inside the tube includes operating, or permitting to operate, a source of an at least longitudinally extending magnetic field inside the tube supported in or by a magnetic field-generating logging tool.

3. The method according to claim 1 wherein the step a) of energizing the tube with an at least longitudinally extending magnetic field generated inside the tube includes operating, or permitting to operate, a source of an at least longitudinally extending magnetic field inside the tube supported in or by a magnetic field-generating logging tool and wherein the magnetic field-generating logging tool is or is operatively connected to the magnetic field-detecting logging tool.

4. The method according to claim 1 including a step of causing conveyance of at least the magnetic field-detecting logging tool from a position remote from the tube to two or more locations, inside the tube, that are spaced from one another along the tube; and carrying out the steps a) and b) in respect of the respective two or more locations.

5. The method according to claim 1 including a step of causing conveyance of at least the magnetic field-detecting logging tool from a position remote from the tube to two or more locations, inside the tube, that are spaced from one another along the tube; and carrying out the steps a) and b) in respect of the respective two or more locations, the method further including supporting at least the magnetic field-detecting logging tool on wireline, that connects the magnetic field-detecting logging tool to one or more items of equipment that are remote from the tube, during such conveyance.

6. The method according to claim 1 including a step of causing conveyance of at least the magnetic field-detecting logging tool from a position remote from the tube to two or more locations, inside the tube, that are spaced from one another along the tube; and carrying out the steps a) and b) in respect of the respective two or more locations, the method further including supporting at least the magnetic field-detecting logging tool on wireline, that connects the magnetic field-detecting logging tool to one or more items of equipment that are remote from the tube, during such conveyance; and further including supporting at least the magnetic field-detecting logging tool on wireline, that connects the magnetic field-detecting logging tool to processing apparatus that is remote from the tube, during carrying out of at least steps a) and b).

7. The method according to claim 1 wherein the tube is or includes wellbore casing and/or liner.

8. The method according to claim 1 including a step of causing conveyance of at least the magnetic field-detecting logging tool from a position remote from the tube to two or more locations, inside the tube, that are spaced from one another along the tube; and carrying out the steps a) and b) in respect of the respective two or more locations; wherein the tube is or includes wellbore casing and/or liner; and wherein the at least two locations inside the tube are non-coincident with any casing collars (if present) forming part of the tube.

9. The method according to claim 1 wherein the tube is one of a plurality of serially interconnected tubes fixed in a subterranean location and defining a hollow column communicating with a surface location or communicating with a further hollow column that is connected to a surface location.

10. The method according to claim 1 wherein the magnetic field-detecting logging tool includes a plurality of Hall-effect detectors of magnetic energy.

11. The method according to claim 1 wherein the magnetic field-detecting logging tool includes a plurality of Hall-effect detectors of magnetic energy and wherein the plurality of Hall-effect detectors of magnetic flux are arrayed in a circular pattern defined circumferentially with respect to the magnetic field-detecting logging tool.

12. The method according to claim 1 wherein the magnetic field-detecting logging tool includes a plurality of Hall-effect detectors of magnetic energy and further includes one or more arms supporting one or more pads mounting at least one pad-mounted Hall-effect sensor, the one or more arms being moveable from a retracted position in which the at least one pad-mounted Hall-effect sensor is spaced from the material of the tube; and a deployed position in which the pad contacts the material of the tube, the method including causing movement of the one or more arms between the retracted and deployed positions.

13. The method according to claim 1 wherein when an applicable magnetisation law is non-linear, the model of the relationship between the two or more magnetic flux signals generated in the step b) and the tube wall thickness is of the form:

$$\nabla_2 \cdot (\mu(H_1)\vec{H}_1|_{z=\zeta}\zeta) = 0 \tag{1}$$

wherein $\mu(H_1)$ is magnetic permeability of the material of the ferromagnetic tube; $\vec{H}_1$ is the magnetic field within the material of the wall of the ferromagnetic tube; $\zeta$ represents the nominal thickness of the tube wall; z is the thickness direction of the tube wall; and $\nabla_2$ is the gradient operator with respect to the material of the wall of the ferromagnetic tube.

14. The method according to claim 1 wherein when an applicable magnetisation law is non-linear, the model of the relationship between the two or more magnetic flux signals generated in the step b) and the tube wall thickness is of the form:

$$\nabla_2 \cdot (\mu(H_1)\vec{H}_1|_{z=\zeta}\zeta) = 0 \tag{1}$$

wherein $\mu(H_1)$ is magnetic permeability of the material of the ferromagnetic tube; $\vec{H}_1$ is the magnetic field within the material of the wall of the ferromagnetic tube; $\zeta$ represents the nominal thickness of the tube wall; z is the thickness direction of the tube wall; and $\nabla_2$ is the gradient operator with respect to the material of the wall of the ferromagnetic tube and wherein the magnetic permeability $\mu(H_1)$ is approximated in accordance with the expression $$\mu(H) = \alpha\left(1 + \frac{H_0}{H}\right)$$

in which $H_0$ is a defect-free flux leakage response representing a field strength defect-free offset in a magnetization plot of the tube averaged across two or more sensors of the magnetic field-detecting logging tool and H is a maximum flux leakage response in the presence of a defect measured by the magnetic field-detecting logging tool.

15. The method according to claim 1 wherein when an applicable magnetisation law is non-linear, the model of the relationship between the two or more magnetic flux signals generated in the step b) and the tube wall thickness is of the form:

$$\nabla_2 \cdot (\mu(H_1)\vec{H}_1|_{z=\zeta}\zeta) = 0 \tag{1}$$

wherein $\mu(H_1)$ is magnetic permeability of the material of the ferromagnetic tube; $\vec{H}_1$ is the magnetic field within the material of the wall of the ferromagnetic tube; $\zeta$ represents the nominal thickness of the tube wall; z is the thickness direction of the tube wall; and $\nabla_2$ is the gradient operator with respect to the material of the wall of the ferromagnetic tube; and wherein the step c) includes a step g) of integrating the expression (1) with a magnetic field $H_2$ derived from the magnetic flux signals generated in the step b) and the magnetic permeability $\mu(H_2)$ of an interior of the tube other than the material of the tube wall.

16. The method according to claim 1 at least the steps c) to e) of which are carried out using a programmed processing apparatus.

17. The method according to claim 1 including a step of h) generating one or more images of the tube wall thickness profile from the one or more signals generated in the step f).

18. The method according to claim 1 including a step of i) transmitting, storing, saving or processing the one or more signals generated in the step f) or data representative thereof.

19. The method according to claim 1 including a step of h) generating one or more images of the tube wall thickness profile from the one or more signals generated in the step f); and further including a step j) of transmitting, storing, saving, processing or printing one or more said images of the tube wall thickness.

20. An apparatus for carrying out a method according to claim 1 including a source of a magnetic field that is capable of extending at least longitudinally along an interior of the tube, the source being moveable along the interior of the tube; the magnetic field-detecting logging tool that is moveable along the interior of the tube and that is capable of carrying out the step b); and processing apparatus to which the magnetic field-detecting logging tool is operatively connected or connectable and that is capable of carrying out at least the steps c) to e).

21. The apparatus according to claim 20 the processing apparatus of which also is capable of carrying out the step f).

22. The apparatus according to claim 20 wherein the magnetic field-detecting logging tool includes a plurality of Hall-effect detectors of magnetic energy.

23. The apparatus according to claim 20 wherein the magnetic field-detecting logging tool includes a plurality of Hall-effect detectors of magnetic energy and wherein the plurality of Hall-effect detectors of magnetic energy are arrayed in a circular pattern defined circumferentially with respect to the magnetic field-detecting logging tool.

24. The apparatus according to claim 20 wherein the magnetic field-detecting logging tool includes a plurality of Hall-effect detectors of magnetic energy and the apparatus including one or more arms supporting one or more pads mounting at least one pad-mounted Hall-effect sensor, the one or more arms being moveable from a retracted position in which the pad-mounted Hall-effect sensor is spaced from the material of the tube; and a deployed position in which the pad contacts the material of the tube, the method including causing movement of the one or more arms between the retracted and deployed positions.

25. The apparatus according to claim 20 the processing apparatus of which is programmable.

26. The apparatus according to claim 20 wherein the step a) of energizing the tube with an at least longitudinally extending magnetic field generated inside the tube includes operating, or permitting to operate, a source of an at least longitudinally extending magnetic field inside the tube supported in or by a magnetic field-generating logging tool, and wherein the source is supported in or by the magnetic field-generating logging tool.

27. The apparatus according to claim 20 wherein the step a) of energizing the tube with an at least longitudinally extending magnetic field generated inside the tube includes operating, or permitting to operate, a source of an at least longitudinally extending magnetic field inside the tube supported in or by a magnetic field-generating logging tool, wherein the source is supported in or by the magnetic field-generating logging tool, and wherein the magnetic field-generating logging tool and the magnetic field-detecting logging tool are common one to the other or are secured one to the other.

28. The apparatus according to claim 20 including at least one logging tool supported by and operatively connected using wireline.

29. The apparatus according to claim 20 including at least one logging tool supported by and operatively connected using wireline, wherein the wireline interconnects the magnetic field-detecting logging tool and the processing apparatus.

* * * * *